United States Patent [19]

Jenne

[11] 3,721,963

[45] March 20, 1973

[54] PHOTON TO DIGITAL CONVERTER USING PHOTON FLUX INTEGRATION

[75] Inventor: Fredrick B. Jenne, Huntington Beach, Calif.

[73] Assignee: North American Rockwell Corporation, El Segundo, Calif.

[22] Filed: March 13, 1972

[21] Appl. No.: 234,050

[52] U.S. Cl. ....................340/173 LM, 250/219 QA

[51] Int. Cl. ....................G11c 13/04

[58] Field of Search....................340/173 LM, 340/173 R; 250/219 QA, 219 D; 307/311

[56] References Cited

UNITED STATES PATENTS

| | | | |
|---|---|---|---|
| 3,229,047 | 1/1966 | Simpson | 340/173 LM |
| 3,252,143 | 5/1966 | Sundblad | 340/173 LM |

*Primary Examiner*—Terrell W. Fears

*Attorney*—L. Lee Humphries et al.

[57] ABSTRACT

Output voltage levels on precharged photo-diodes receiving light inputs are sampled after a period of time sufficient to permit photon flux integration. The sampled voltage levels are converted into digital signals representing digital data of either a true or false logic state. The data signals are stored in a multibit shift register until called for or until the next sampling interval. When all the data represented by the light inputs have been processed through the shift register to an output, the shift register is set to a predetermined condition and the process is interrupted.

10 Claims, 3 Drawing Figures

PHOTON TO DIGITAL CONVERTER USING PHOTON FLUX INTEGRATION

FIELD OF THE INVENTION

The invention relates to a photon to digital converter using photon flux integration and more particularly to such a converter in which the integration is achieved by controlling the sampling period of photo-diodes used as input devices and by storing digital data representing the sampled voltages in a shift register between sampling intervals.

SUMMARY OF THE INVENTION

Briefly the invention comprises a plurality of photo-diodes receiving photon (light) inputs from light sources. The photo-diodes are precharged to a voltage level prior to interrogating the light inputs The voltage level on each photo-diode decays as a function of the intensity of the light input to the photo-diode. Delay circuitry actuates sampling circuitry for taking a sample of the voltage level on a photo-diode after a period of time sufficient to permit photon flux integration, i.e. a period of time sufficient to permit a discrimination between high and low light levels. The sampling circuit converts the sampled voltage levels into voltage levels representing digital data i.e. logic one (true) or logic zero (false). The digital data representing the light inputs are stored at bit positions of a multibit shift register. Subsequently the data is shifted out of the shift register for further processing as a function of a particular system application.

In a preferred embodiment, circuit techniques are utilized to prevent race conditions from occurring and to maintain stored voltage levels throughout the converter between input intervals i.e. during static operation intervals.

Therefore, it is an object of this invention to provide an improved photon to digital converter using photon flux integration techniques.

It is another object of this invention to provide a photon to digital converter using photo-diodes as input elements and a field effect transistor shift register for storing digital data representing input light intensities.

A further object of this invention is to provide a photo-diode detection system including circuitry for preventing race conditions from occurring in the system.

Another object of this invention is to provide a photon to digital converter using time delay circuit techniques for controlling the sampling time of the voltage levels across photo-diodes receiving light inputs.

Another object of this invention is to provide circuitry for enabling active and static operation with maximum voltage contained in a single monolithic substrate for enabling active and static operation with maximum voltage level utilization and minimum voltage level loss.

These and other objects of this invention will become more apparent when taken in connection with the description of the drawings, a brief description of which follows:

BRIEF DESCRIPTION OF DRAWINGS

FIG. 3 is a diagram of the signals taken from various points in the FIG. 1 schematic diagram.

DESCRIPTION OF PREFERRED EMBODIMENT

Although the converter can be utilized in connection with various systems, one application is an embossed card reader system. In such a system, a card containing embossed, or raised, characters is advanced past a totally reflecting surface of a prism. The embossed characters of, for example, a credit card, are urged into contact with a resilient film disposed adjacent to the surface of the prism. As is well known, the embossed characters urged into optical contact with the reflecting surface of the prism frustrate the internal reflection of light passing through the prism at the points of contact. Light reflected from the inner surface of the prism thereby projects a pattern corresponding to the image of the characters. After the characters have been read, the film becomes disengaged from the surface of the prism so that the light is not reflected.

The reflected image from the prism is reflected onto light sensing elements such as photocell sensors or photo-diodes, as described in more detail subsequently herein. In effect, the characters are scanned by the light sensing devices for producing a pattern of binary ones and zeroes corresponding to the characters. For example, eight scans may be utilized in connection with a single character. If 16 light detecting elements are provided for each scan, an $8 \times 16$ pattern of ones and zeroes can be generated to represent each character. The data thus generated can be used for example for comparison purposes in connection with a credit check.

Figure 1:
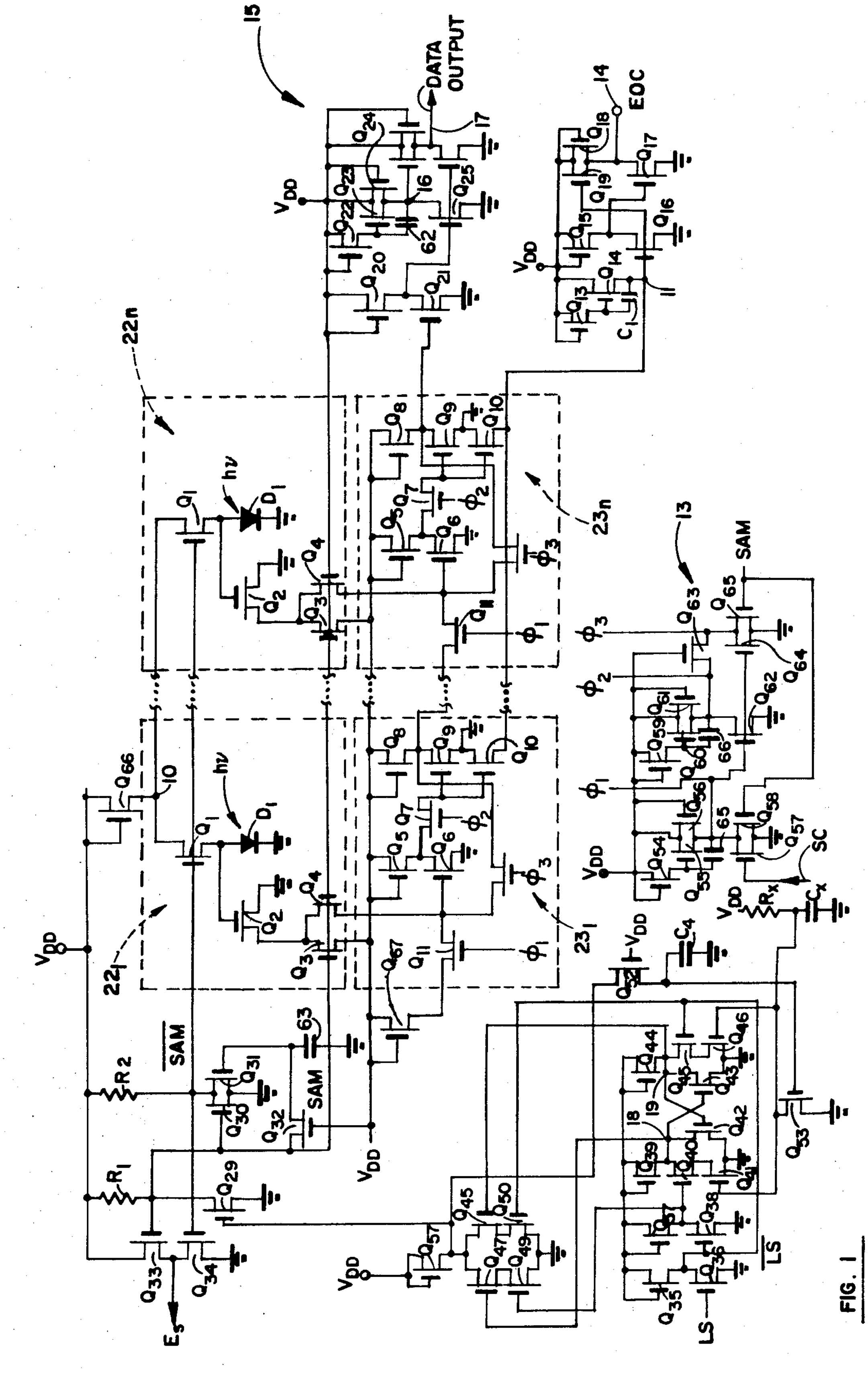
FIG. 1 is a schematic diagram of a preferred embodiment of the invention.

FIG. 1 illustrates a preferred embodiment of the converter system. The system comprises photo-diode photon (light) input and converter circuits designated by the notations $D_1$ for the photo-diodes at each input position (16 for the embodiment shown); $Q_1$ for the precharge field effect transistor at each position; $Q_2$ and $Q_3$ for the voltage level comparator field effect transistors at each position; and $Q_4$ for the sample gate field effect transistors at each position. $Q_1$ is connected through $Q_{66}$ to voltage supply $V_{DD}$. $Q_{66}$ is used to provide a voltage level at terminal 10 which is approximately a threshold lower than the $\overline{SAM}$ voltage level applied to the gate electrodes of the $Q_1$ transistors. $\overline{SAM}$ is used to designate the inversion of a sample signal which is applied to the gate electrode of the $Q_3$ and $Q_4$ transistors. The sample signal is applied to $Q_3$ to reduce the power consumption of the voltage level comparator. As a result of applying a reduced voltage at terminal 10, the precharge voltage levels applied across the $D_1$ photodiodes prior to a light sampling interval are substantially identical. As a result, the circuit ($Q_2$, $Q_3$, and $Q_4$) can accurately discriminate between input light levels represented by the voltage levels across $D_1$ as described in more detail subsequently. The $Q_3$ transistors are connected in series between $V_{DD}$ and $Q_2$ transistors and act as a load for the $Q_2$ sensing transistor. The $Q_2$ transistors having their gate electrodes connected to the anodes of the $D_1$ photo-diodes, are connected between electrical ground and the $Q_3$ transistors. The $Q_2$ transistors sense the voltage level across the photodiode $D_1$ as described subsequently.

The blocks containing the photodiodes corresponding to each bit position are labeled $22_1$ through $22_n$. As indicated above, 16 bit positions are used. As a result, $n$ would equal 16.

Figures 2, 3A, 3B, 3C, 3D, 3E, 3F:
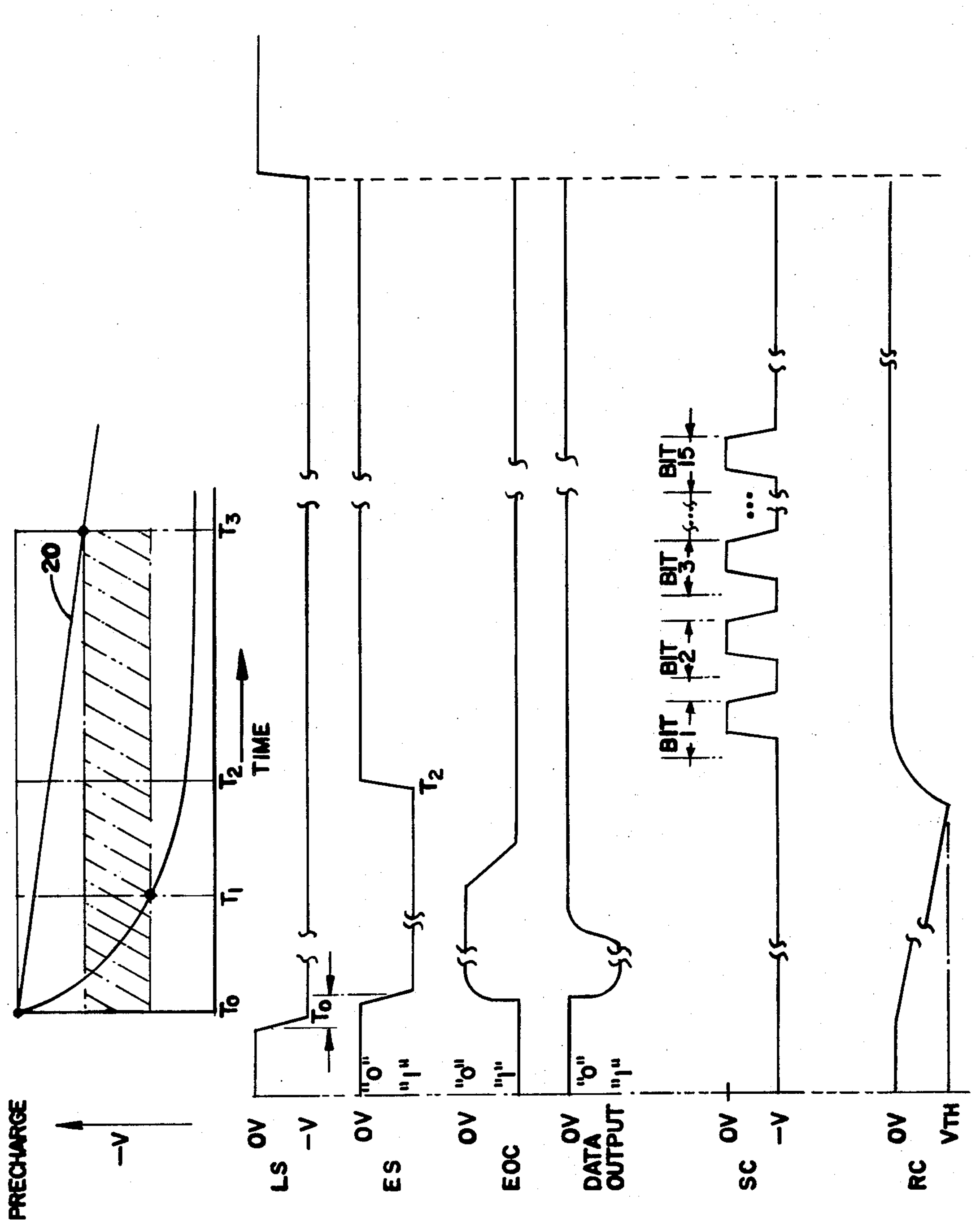
FIG. 2 is a graph showing the relationship between light intensity and voltage level decay. In addition, the preferred voltage sampling time relative to signals shown in FIG. 3 is also illustrated.

For purposes of describing the FIG. 1 embodiment, electrical ground represents a false logic state and approximately the voltage level of $V_{DD}$ represents a true logic state. It is also pointed out that since negative voltage levels are shown in FIG. 2, P-channel field effect transistors are assumed. It should be understood that other logic connections and semiconductor devices can also be selected.

The $Q_4$ transistors controlled by a voltage sample signal SAM, provides input voltage levels representing digital data to a multibit field effect shift register comprising 16 bit positions which correspond to the 16 photodiodes. Bit positions two through 15 have been omitted for convenience. Corresponding input circuits have also been omitted.

Each bit position designated $23_1$ through $23_n$ is implemented by an input inverter comprising series connected field effect transistors, $Q_5$ and $Q_6$. $Q_5$ and $Q_6$ are connected between $V_{DD}$ and electrical ground. The gate electrode of $Q_6$ receives the input from $Q_4$ or from a preceeding stage via $Q_{11}$ which has its gate electrode connected to the $0_1$ clock signal. The outputs from the input inverters are sampled through $Q_7$ field effect transistors controlled by the $0_2$ clock signal. $0_2$ is true following $0_1$. The outputs from the $Q_7$ transistor provides inputs to the output inverters comprising $Q_8$ and $Q_9$ transistors connected in electrical series between $V_{DD}$ and electrical ground. The gate electrodes of the $Q_9$ transistors receive the outputs from the $Q_7$ transistors.

The $Q_7$ transistor also provides inputs to $Q_{10}$ transistor connected between electrical ground and a common terminal 11 at the input of an end of character (EOC) circuit. In effect the $Q_{10}$ transistors implement a NOR gate. As data representing a scanned character is shifted out of the shift register, the true voltage level from field effect transistor $Q_{67}$, connected to the input of the first shift register bit position, is shifted into each bit position. When all bit positions are true, which can also occur if all of the $D_1$ photodiodes have been discharged by light inputs, the NOR gate input is true and an end of character (EOC) pulse as shown in FIG. 3*c* is generated.

The $Q_{12}$ field effect transistor, controlled by the $0_3$ clock, provides feedback from the output inverter to the input inverter for enabling the shift register to store input data until replaced by data generated by a subsequent light input.

The $0_3$ clock is the $0_2$ clock delayed by a $\Delta t$ interval to prevent possible race conditions from occurring at a bit position. The clock signals are generated by clock signal generator 13 described subsequently.

The end of character circuit comprises an input inverter implemented by the NOR gate, described in connection with the shift register, in series with the bootstrapped field effect transistor load circuit between electrical ground and $V_{DD}$. The bootstrapped circuit includes $Q_{13}$ connected between $V_{DD}$ and the gate electrode of $Q_{14}$ for precharging capacitor $C_1$, between the gate electrode of $Q_{14}$ and terminal 11, when terminal 11 is connected to electrical ground. That condition exists when data from the photodiode is being shifted out of the register and if all of the sampled voltage levels into the shift register bits are not true.

When terminal 11 becomes true, the increased voltage at the terminal is fedback across $C_1$ to enhance the conduction of $Q_{14}$ for driving terminal 11 to approximately $V_{DD}$. In other words, the threshold drop across $Q_{14}$ is reduced.

The output from the first inverter provides an input to a second inverter comprising $Q_{15}$ in series with $Q_{16}$ between $V_{DD}$ and electrical ground. In addition, the first inverter output provides an input to $Q_{19}$ of the output inverter. $Q_{19}$ is connected in electrical series with $Q_{17}$ between $V_{DD}$ and electrical ground.

The gate electrode of $Q_{17}$ receives the output from the second inverter. $Q_{18}$ in parallel with $Q_{19}$ supplies leakage to the EOC output terminal 14 between character scan intervals.

Briefly when scanned data is being stored by the shift register and if all of the shift register bits are not true, $Q_{16}$ and $Q_{19}$ are held off by the false state at 11 and $Q_{15}$ is on and $Q_{17}$ is turned on for connecting the EOC output terminal to electrical ground. When 11 becomes true, $Q_{16}$ and $Q_{19}$ are on and $Q_{17}$ is off. As a result, EOC is set true. Leakage is supplied to terminal 14 by $Q_{18}$ which is always on.

Data from the shift register is shifted to a data output terminal through output circuit 15. The circuit includes a first inverter implemented by $Q_{20}$ and $Q_{21}$ connected in electrical series between $V_{DD}$ and electrical ground. Inverter circuits are used to generate output voltage levels having the proper phase relationship relative to an input voltage level. A second inverter comprising a bootstrapped field effect transistor circuit parallel with a clamp field effect transistor circuit in electrical series with $Q_{25}$ receives the output from the first inverter circuit on the gate electrode of $Q_{25}$. The bootstrapped circuit implemented by $Q_{22}$, $Q_{23}$ and capacitor $C_2$ operates substantially as described in connection with the same circuit described for the EOC output. Similarly, the clamp field effect transistor circuit implemented by $Q_{24}$ in parallel with $Q_{23}$ operates substantially as described in connection with transistor $Q_{18}$ of the EDC circuit. The combination of a bootstrapped circuit and a clamp circuit enables a point e.g. 16, to be dynamically set to a maximum voltage level, $V_{DD}$, upon receipt of an input and to approximately maintain that voltage level through the operation of the clamp transistor until a new input is received.

The output from the second inverter supplied an input to the output inverter implemented by $Q_{26}$ and $Q_{28}$ in electrical series between $V_{DD}$ and electrical ground. $Q_{27}$ (clamp) is connected in parallel with $Q_{24}$. The data output terminal is connected between $Q_{27}$ and $Q_{28}$.

Briefly when a true data bit is received on the gate electrode of $Q_{21}$, $Q_{25}$ and $Q_{28}$ are turned off and the output is set true. When a false data bit is received on the gate electrode of $Q_{21}$, $Q_{25}$ and $Q_{28}$ are turned on and the output is set false. The clock signal generator 13 includes a shift command (SC) input and a photodiode voltage sample (SAM) input. The SC input may be a constant true voltage level or it may be in the form of a pulse received just after a sample pulse. The SAM input disables the clock generator during the sample period as described subsequently. The SC signal is shown in FIG. 3*e*. The signal is normally true (−V) until the end of the sample period, i.e. when ES goes false (OV). The signal goes false once during the cycle for shifting the digital data stored in each shift register bit position to be shifted to the data output terminal 17. Shift pulses for bits 1, 2, 3, and 15 are shown by FIG. 3*e*.

The clock generator includes a first inverter comprising $Q_{54}$, $Q_{55}$, $C_5$ implementing a bootstrap load circuit in series with $Q_{57}$ which receives the SC input, on its gate electrode. $Q_{58}$ receives the SAM signal on its gate electrode to disable the inverter during SAM. $Q_{56}$ in parallel with $Q_{55}$ forms a clamp for supplying leakage to the $\emptyset_1$ terminal between cycles.

The generator 13 also includes a second inverter similarly implemented by a bootstrapped load circuit ($Q_{59}$, $Q_{60}$, $C_6$); clamp circuit ($Q_{61}$) in electrical series with $Q_{62}$ between $V_{DD}$ and electrical ground. The first inverter was also connected between $V_{DD}$ and electrical ground. The gate electrode of $Q_{62}$ receives the output from the first inverter which is also provided as a $\emptyset_1$ clock on the $\emptyset_1$ terminal.

The output from the second inverter is provided on the $\emptyset_2$ terminal as the $\emptyset_2$ clock signal. Since the second inverter is controlled by the first inverter, the $\emptyset_2$ clock occurs after $\emptyset_1$, i.e. the clock signals are distinct in phase.

The output from the second inverter is passed through $Q_{63}$ (serving as a delay resistor) to the $\emptyset_3$ terminal. The inherent capacitance at the $\emptyset_3$ terminal plus the series resistance of$Q_{63}$ delays the $\emptyset_3$ clock relative to the $\emptyset_2$ clock. The delay is necessary to present the occurrence of race conditions in the shift register when feeding back the output from a bit position of a shift register to its input through the $Q_{12}$ transistor which is controlled by $\emptyset_3$.

Transistors $Q_{64}$ is controlled by the output from the first inverter and would cause $\emptyset_3$ to be in phase with $\emptyset_2$ except for $Q_{63}$ and the inherent capacitance at the $\emptyset_3$ terminal. $Q_{65}$ disables the $\emptyset_3$ clock during SAM as previously described. The significance and use of the clock is explained in more detail during the description of the operation of the system.

One of the major parts of the system is the RS flip-flop, delay circuit and exclusive OR circuit used to generate the SAM signal in response to a light sample signal (LS). The SAM signal is equivalent to the evaluation signal (ES) shown by FIG. 3*b*.

First and second inverters ($Q_{35}$ and $Q_{36}$; $Q_{37}$ and $Q_{38}$) provide the proper phase relationship between LS received at the gate electrode of $Q_{38}$ and $\overline{LS}$ received at the gate electrode of $Q_{38}$(from the output of the first inverter). In other words LS is inverted to form $\overline{LS}$. LS and $\overline{LS}$ forms the set and preset input to the RS flip-flop. The inverter as well as the half stages at the flip-flop are connected between $V_{DD}$ and electrical ground. One-half of the RS flip-flop comprises $Q_{39}$, $Q_{40}$, and $Q_{41}$ field effect transistors in electrical series with each other. $Q_{42}$ is in electrical parallel with $Q_{40}$ and $Q_{41}$. The other half of the flip-flop comprise $Q_{44}$, $Q_{45}$ and $Q_{46}$ in electrical series with each other. $Q_{43}$ is in electrical parallel with $Q_{45}$ and $Q_{46}$.

$Q_{40}$ receives the LS input from the output of the second inverter to cause ES to be set true as shown in FIG. 3*b*. $Q_{45}$ receives the $\overline{LS}$ input from the output of the first inverter. $Q_{41}$ and $Q_{46}$ receive inputs from the $R_xC_x$ network as described subsequently. In addition to gate electrodes of$Q_{41}$ and $Q_{46}$ are connected through $Q_{53}$ to electrical ground whenever the gate electrode of$Q_{53}$ is true.

The exclusive OR circuit includes $Q_{51}$ connected in electrical series with the parallel series combination of $Q_{47}$, $Q_{49}$, and $Q_{48}$, $Q_{50}$ between $V_{DD}$ and electrical ground.

The output from the exclusive OR circuit provides an input to the gate electrode of $Q_{29}$ for controlling the ES output.

The flip-flop output 18 is connected to the gate electrode of $Q_{47}$ and the flip-flop output 19 is connected to the gate electrode of $Q_{48}$. The gate electrode of $Q_{49}$ and $Q_{50}$ are connected to the output of the second and first inverters respectively i.e. LS and $\overline{LS}$.

The output of the exclusive OR circuit is normally true as indicated by the relatively long ES false (OV) interval. In other words, when $Q_{29}$ is on, $Q_{33}$ is off and the ES output depends on the $\overline{SAM}$ voltage level on the gate electrode of $Q_{34}$. Since $\overline{SAM}$ is true when ES is false, $Q_{34}$ is on and ES is at an OV level.

$V_{DD}$ is applied across $R_1$ and $Q_{29}$ and to the SAM conductor as described subsequently. $Q_{33}$ and $Q_{34}$ are connected in series between $V_{DD}$ and electrical ground. The ES output may not be necessary unless external observation of the system is desired. Briefly, the flip-flop and exclusive OR circuit function to control the sampling of the analog voltage level across the photodiode beginning when LS makes a transition from either a logic "1" state to a logic "0" state or vice versa. For example, if LS goes true (assuming a previous false level), $Q_{40}$ is turned on and $Q_{45}$ is turned off. Assuming $Q_{42}$ to have been previously off and $Q_{43}$ previously on, the gate electrode of $Q_{29}$ is connected to electrical ground through $Q_{47}$ and $Q_{49}$ (turned on by LS). $Q_{47}$ was previously on. As a result, after a finite delay due to the charge of C3 through $Q_{32}$, $\overline{SAM}$ becomes false and $Q_{34}$ is turned off. ES and SAM are set true.

$\overline{SAM}$ is held false by $Q_{30}$ and $Q_{31}$. Current through $Q_{30}$ and $Q_{31}$ is supplied by $V_{DD}$ through $R_2$. Since $\overline{SAM}$ is false the $Q_1$ transistors are turned off. In other words, the precharge interval ends when $\overline{SAM}$ goes false. This sequence enables the input light to be evaluated by photodiodes $D_1$. $Q_2$ is initially on since $D_1$ is precharged to a voltage level approximately equal to $V_{DD}$ (less threshold drop across $Q_{66}$). Therefore initially, the first register bit position receives a false input through the $Q_4$ sample gate which is held on by SAM. $Q_3$ is also held on to connect $V_{DD}$ to electrical ground through $Q_2$.

It is pointed out that during SAM, the clock signals $\emptyset_1$ and $\emptyset_3$ are held off (false) by the SAM signal connected to the gate electrode of $Q_{58}$, $Q_{65}$. $\emptyset_2$ is set true during SAM. However $\emptyset_1$ and $\emptyset_3$ must be false to prevent premature shifting of data from a preceeding stage into another stage via $Q_{11}$ (controlled by $\emptyset_1$) and to prevent feedback from the output of a bit position to the input via $Q_{12}$ (controlled by $\emptyset_3$).

When light is received by $D_1$ it is either high or low intensity depending on the character being read. For example if no part of the character is visible during a scan relatively low intensity light is received by $D_1$. On the other hand, if a part of the character is visible during a scan, relatively high intensity light is received. As it is well known, light received by a photodiode generates photocurrents which neutralizes the charge stored across the photodiode and causes a resultant reduction in the voltage level.

The phenomena is illustrated in FIG. 2. For low intensity light the voltage decay is illustrated by line 20. Line 21 illustrates a high intensity light decay situation. The time $T_0$ designates the beginning of the light input evaluation and $T_2$ signals the sample time (described subsequently). The sample time corresponds to the end of the ES pulse as shown in FIG. 3*b*.

When the output of the exclusive OR circuit went false, $C_4$ discharged through $Q_{52}$ to electrical ground. After an RC delay the gate electrode of $Q_{53}$ was set false and $Q_{53}$ turned off. Thereafter $C_x$ began to charge through $R_x$ toward $V_{DD}$. The RC charge signal is illustrated in FIG. 3*f*. When the charge on $C_x$ reaches the threshold voltage ($V_{th}$), of $Q_{41}$ and $Q_{46}$, the flip-flop changes states. Point 18 goes false and point 19 goes true. As a result, the output from the exclusive OR circuit is set true and ES goes false.

When ES goes false, ($Q_{29}$ is on), SAM is set false and after a finite delay due to $C_3$ and $Q_{32}$, $\overline{SAM}$ is set true. The $R_xC_x$ delay is selected to enable the voltage decay across $D_1$ to have reached a sufficient level to enable a discrimination between a high intensity and a low intensity light input.

A voltage sample could have been taken at any time between $T_1$ (see FIG. 2) and $T_3$. However, $T_2$ (midway) was selected for convenience. The cross-hatched area in FIG. 2 indicates the area of uncertainty of the $Q_2$, $Q_3$ voltage level detector circuit. As shown, at $T_0$ the diode is precharged to a voltage level. At $T_1$ and $T_3$ the voltage levels across $D_1$ for the high and low condition are sufficiently distinct to enable the low intensity voltage level to be sampled as a logic zero and the high intensity to be sampled as a logic one. The process of the voltage decay across the photodiode due to light input is often referred to as photon flux integration.

If the voltage level on the gate electrode of $Q_2$ is low at $T_2$, $Q_2$ is off and a true data bit is received by the first bit position of the shift register at the gate electrode of $Q_6$. If the voltage level is high, a false bit is received.

When SAM goes false, the clocks are permitted to operate. However, because $\mathbf{0}_2$ was previously true, data from $Q_4$ is clocked to the gate electrode of $Q_9$ before $\mathbf{0}_3$ becomes true.

When SC becomes false and $\mathbf{0}_1$ goes true, data from a prior stage is shifted into the following bit position. For the first bit position, a logic one is shifted in via transistor $Q_{67}$. Therefore, the sampled voltage level from $D_1$ (e.g. true or false) would have been gated into bit positions two during $\mathbf{0}_1$. During $\mathbf{0}_2$, $Q_7$ is turned on and a true or false data bit (depending on the input to the bit position — true for the first bit position) is shifted to the gate electrode of$Q_9$. Shortly after $\mathbf{0}_2$, $\mathbf{0}_3$ becomes true and turns on $Q_{12}$ to feedback the output between $Q_8$ and $Q_9$ to the input of the bit position. The data is thus stored until the next SC pulse. Normally SC occurs after the sample interval has been completed.

I claim:

1. A system for converting light inputs of different intensities into digital data, said system comprising, means responsive to light inputs for converting voltage levels representing said light intensities into digital signals after a delay sufficient to enable a discrimination between light inputs of different intensities, register means connected to said means responsive for storing said digital signals, means enabling said light inputs to be received by said means responsive including means generating signals to said means responsive for controlling said delay.

2. The system recited in claim 1 wherein said means responsive comprises, means precharged to a voltage level, said means responding to light inputs for causing a change in said voltage level as a function of the intensity of said light input, and means controlled by the changed voltage level for generating a digital signal at the end of said delay to permit a sufficient change in said voltage level whereby said digital signal accurately represents the light intensity of the light inputs.

3. The system recited in claim 2 wherein said register means includes a clock controlled feedback circuit between the output and input of each bit position of said register, means for enabling said digital signal to be stored until a subsequent light input is received by said means responsive, said register means comprising a plurality of bit positions for storing a plurality of digital signals representing the intensities of light inputs, means enabling said register means to provide an output of said digital signals when all bit positions contain stored digital signals, circuit means responsive to each of said bit positions for indicating when all of said digital signals have been received at said output.

4. The system recited in claim 3 wherein said register means further includes clock controlled circuitry for isolating consecutive bit positions of said register until the output of said stored digital signals.

5. The system recited in claim 4 wherein said system further comprises, clock generator means for generating clock signals to said register means for enabling said register means to store said digital signals and to provide an output of said digital signals, said clock generator means including means operating simultaneously with the receipt of said light inputs by said means responsive for controlling said clock signals whereby each bit position of said register means is isolated from each other bit position.

6. The system recited in claim 5 wherein said clock generator means includes circuitry for generating first, second, and third clock signals, said first clock in cooperation with said second clock signal controlling the transfer of digital signals from one bit position to another when said digital signals are being received at said output, said first clock signal controlling said circuitry on the input of each of said bit positions for isolating said bit position until after said delay, said third clock signal being slightly delayed in phase relative to said second clock signal, said third clock signal controlling the feedback from the output to the input of each of said bit positions for enabling digital signals to be stored by each bit position until all bit positions are filled.

7. The system recited in claim 5 wherein said means enabling comprises, circuitry receiving an input signal indicating the receipt of light by said means responsive, said circuitry generating an output signal upon receipt of said input signal for disabling said clock generator means and for enabling said means controlled, said circuitry further including delay means responding to the output from said circuitry for initiating said delay, said delay being commensurate with the period required by said means responsive to discriminate between light inputs, said circuitry being responsive to said delay means for generating a different output signal representing the end of said delay whereby the voltage level remaining on said precharged means could be sampled and converted into a digital signal representing a light input.

8. The system recited in claim 2 wherein said enabling means comprises circuitry receiving an input signal indicating the receipt of light inputs to said means responsive, said circuitry generating an output signal for enabling said controlled means to become operative, said circuitry also including delay means triggered by said output signal for initiating said delay, said circuitry being responsive to said delay means for causing said circuitry to generate a different output signal at the end of said delay, said different signal enabling said controlled means to provide a digital signal to said register means representing the voltage level on said precharged means at the end of said delay.

9. A circuit for producing a voltage level at a circuit node during one operating interval and for maintaining said voltage level until the next operating interval, said circuit comprising a field effect transistor inverter circuit having a circuit node between a bootstrap field effect transistor circuit and an inverting field effect transistor, said bootstrap field effect transistor circuit and inverting field effect transistor connected between first and second voltage levels, said bootstrap circuit being responsive to an input during a first operating interval for setting said circuit node to said first voltage level, said bootstrap circuit including feedback means between said node and the gate electrode of a field effect transistor implementing said bootstrap circuit for enhancing the conduction of said second recited field effect transistor whereby the threshold drop across said second recited field effect transistor is substantially minimized and said circuit node is set to said first voltage level, a third field effect transistor connected in electrical parallel with said second recited field effect transistor and having its gate electrode connected to said first voltage level for being rendered conductive in response to changes in the first voltage level set at said circuit node between operating intervals whereby said circuit sets said circuit node to said first voltage level during an active operating interval and maintaining said first voltage level at said static circuit node during the intervening interval.

10. A system for converting intelligence bearing light inputs into digital data, said system comprising, means responsive to light inputs for providing a voltage level as a function of the intensity of said light inputs, converter means operative a finite period of time after a light input has been received by means responsive for generating digital voltage levels representing said light intensity, said converter means connected to said means responsive, register means for storing said digital voltage levels, means providing an output of said digital voltage level from said register means, means controlling said converter means after a delay equal to said finite period of time for enabling said converter means to generate said digital voltage levels, said delay being sufficient to permit a discrimination between light inputs of different intensities whereby digital data representing light inputs of different intensities can be generated.

* * * * *

UNITED STATES PATENT OFFICE
CERTIFICATE OF CORRECTION

Patent No. 3,721,963 Dated March 20, 1973

Inventor(s) Frederick B. Jenné

It is certified that error appears in the above-identified patent and that said Letters Patent are hereby corrected as shown below:

On Fig. 1 of the drawing the following changes should be made:

Change "Q57" to --Q51--.
Change "Q45" to --Q48--.
Change "63" to --to C3--.
Lable transistor "12" as --Q67--.
Delete arrow 12 and reference number "12".
Lable both transistors in stages $23_I$ and $23_N$ adjacent "$Q_3$" each as --Q12--.
Change "65" to --C5--.
Change "66" to --C6--.
Lable the transistors connected between "Q25" and "17" as --Q28--.
Place arrowheads on the leads at (pointing toward) "$\phi_1$", "$\phi_2$", and "$\phi_3$".
Change "62" to --C2--.
Lable the transistor between "16" and "17" as --Q26--.
Lable the transistor directly above "17" as --Q27--.

PO-1050
(5/69)

UNITED STATES PATENT OFFICE
CERTIFICATE OF CORRECTION

Patent No. 3,721,963 Dated March 20, 1973

Inventor(s) Fredrick B. Jenne

It is certified that error appears in the above-identified patent and that said Letters Patent are hereby corrected as shown below:

Column 1, line 55 and 56, delete "for enabling ... maximum voltage".

Column 2, line 36, change "for example" to --, for example,--.

Column 3, line 29, change "$O_1$" to --$\emptyset_1$--.

line 31 (both occurrences) change "$O_2$" to --$\emptyset_2$--.

line 32, change "$O_1$" to --$\emptyset_1$--.

line 52, change "$O_3$" to --$\emptyset_3$--.

line 57, change "$O_3$" to --$\emptyset_3$--.

change "$O_2$" to --$\emptyset_2$--.

Column 4, line 37, after "circuit" insert --in--.

line 47, change "EDC" to --EOC--.

line 54, change "supplied" to --supplies--.

line 57, change "$Q_{24}$" to --$Q_{26}$--.

line 60-64, delete "Briefly when ... output is set false" and insert into previous paragraph on line 59.

line 64, start new paragraph with "The clock".

Column 5, line 17, change "$O_1$" to --$\emptyset_1$--.

lines 24 and 25 (each occurrence) change "$O_1$" to --$\emptyset_1$--.

PO-1050
(5/69)

UNITED STATES PATENT OFFICE
CERTIFICATE OF CORRECTION

Patent No. 3,721,963 Dated March 20, 1973

Inventor(s) Fredrick B. Jenne

It is certified that error appears in the above-identified patent and that said Letters Patent are hereby corrected as shown below:

Column 5, lines 27 and 28 (each occurrence), change "$O_2$" to --$\phi_2$--.

line 30, change "$O_1$," to --$\phi_1$,--.

lines 33-35 (each occurrence), change "$O_3$" to --$\phi_3$--.

line 36, change "$O_2$" to --$\phi_2$--.

change "present" to --prevent--.

line 40, change "$O_3$." to --$\phi_3$.--.

line 42, change "$O_3$" to --$\phi_3$--.

change "$O_2$" to --$\phi_2$--.

lines 43 and 44 (each occurrence), change "$O_3$" to --$\phi_3$--.

line 50, change "OR" to --"or"--.

line 59, change "forms" to --form--.

change "preset" to --reset--.

after "input" insert --singles--.

line 60, change "at" to --of--.

Column 6, lines 9, 13, 22, and 33 (each occurrence), change "OR" to --"or"--.

line 57, change "$O_1$" to --$\phi_1$--.

line 58, change "$O_3$" to --$\phi_3$--.

PO-1050
(5/69)

UNITED STATES PATENT OFFICE
CERTIFICATE OF CORRECTION

Patent No. 3,721,963 Dated March 20, 1973

Inventor(s) Fredrick B. Jenne Page 4 of 4

It is certified that error appears in the above-identified patent and that said Letters Patent are hereby corrected as shown below:

line 59, change "$O_2$" to --$\phi_2$--.

line 60, change "$O_1$" to --$\phi_1$--.

change "$O_3$" to --$\phi_3$--.

line 62, change "$O_1$" to --$\phi_1$--.

line 64, change "$O_3$" to --$\phi_3$--.

Column 7, lines 15 and 23 (each occurrence), change "OR" to --"or"--.

line 49, change "$O_2$" to --$\phi_2$--.

line 50, change "$O_3$" to --$\phi_3$--.

line 52, change "$O_1$" to --$\phi_1$--.

line 57, change "$O_1$" to --$\phi_1$--.

change "$O_2$" to --$\phi_2$--.

line 59, after "position -" and before "true", insert --(--.

line 61, change "$O_2$, $O_3$" to --$\phi_2$, $\phi_3$--.

Column 8, line 7, after "signals," insert --and--.

Column 10, line 36, after "means," insert --and--.

Column 10, line 12, after "lever," insert -- and --.

Signed and Sealed this

*fifteenth* Day of *June 1976*

[SEAL]

*Attest:*

RUTH C. MASON
*Attesting Officer*

C. MARSHALL DANN
*Commissioner of Patents and Trademarks*